US007542564B2

(12) United States Patent
Jaakkola

(10) Patent No.: US 7,542,564 B2
(45) Date of Patent: Jun. 2, 2009

(54) HEADSET WITH INTEGRAL HOOK

(75) Inventor: Mikael Jaakkola, Turku (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 11/411,238

(22) Filed: Apr. 24, 2006

(65) Prior Publication Data

US 2007/0263885 A1 Nov. 15, 2007

(51) Int. Cl.
*H04M 1/00* (2006.01)
*H04M 9/00* (2006.01)
*H04R 25/00* (2006.01)

(52) U.S. Cl. ..................... 379/430; 455/575.2; 381/381

(58) Field of Classification Search ................. 379/430; 381/370, 374, 381; 455/90.1, 575.1, 575.2
See application file for complete search history.

(56) References Cited

U.S. PATENT DOCUMENTS 6,359,995 B1 3/2002 Ou ............................. 381/381
6,374,090 B1 * 4/2002 Morales ..................... 455/90.1
2002/0102005 A1 8/2002 Lin ............................ 381/381
2005/0271234 A1 * 12/2005 Bogeskov-Jensen ........ 381/381
2006/0030360 A1 2/2006 Yeh ............................ 455/557

FOREIGN PATENT DOCUMENTS

FR 2863800 A1 6/2005
JP 2001119463 4/2001
JP 2005278129 10/2005
WO WO 2003/107716 A1 12/2003

OTHER PUBLICATIONS http://www.halfa.com/wireless2.htm; HALFA 2002; Title: Blue Cruiser.
http://www.darfon.com/tw/2005_htm/hid/headset_h100.htm; Darfon Electronics Corp., copyright 2006; Title: H100 Detachable ear hook.
English translated abstract of FR2863800A1.
English translated abstract of JP2001119463.
English translated abstract of JP2005278129.

* cited by examiner

*Primary Examiner*—Tuan D Nguyen
(74) *Attorney, Agent, or Firm*—Ware, Fressola Van Der Sluys & Adolphson LLP

(57) ABSTRACT

A monaural headset (one speaker) having a hook structure for holding the headset on the ear of a wearer, with the hook structure able to be stored on the headset housing or in a channel feature of the headset housing, when the headset is not in use.

15 Claims, 6 Drawing Sheets

HEADSET WITH INTEGRAL HOOK

BACKGROUND OF THE INVENTION

1. Technical Field

The present invention pertains to the field of audio speaker technology. More particularly, the present invention pertains to the field of headsets for holding a microphone near or within the ear of a listener.

2. Discussion of Related Art

The state of the art of headsets for listening to e.g. music or other audio media continues to advance. A fundamental problem in the art is how best to enable a person to wear a headset.

In some headset applications, there is a need only for a headset that includes a speaker (and not also a microphone), and that also includes a receiver for wirelessly receiving the audio media to be provided to the wearer of the headset. For example, in case of short-range wireless communication protocol known as Bluetooth, headsets are sometimes used for merely listening to e.g. music, but the headset is somewhat larger than in other headset applications, because it includes both a speaker and also a receiver for receiving the wireless communication. Sometimes in such applications, only a single speaker is used, so that the audio media is provided as monaural (as opposed to stereo).

It is desirable to provide such headsets so as to be easily carried when not in use, i.e. so that the headset has no protruding elements and can therefore be easily put e.g. in a pocket or other small container when not in use.

DISCLOSURE OF INVENTION

Accordingly, in a first aspect of the invention an apparatus is provided comprising: a housing, for holding a speaker, the housing having an ear-facing surface configured for communicating sound from the speaker to the ear of a listener; and a hook structure, formed as an elongated structure from a deformable material and having at least one end removably coupled to the housing.

In accord with the first aspect of the invention, the housing surface may have a channel feature at least partially circumscribing the ear-facing surface, of a depth suitable for containing at least a portion of a length of the hook structure.

Also in accord with the first aspect of the invention, the hook structure may be removably coupled to the housing at or near both ends of the hook structure.

Also in accord with the first aspect of the invention, the hook structure may be formed of an elastomer, such as a thermoplastic elastomer. Alternatively, it may be formed of a metallic material, such as aluminum or a spring metal. Further, it may include a core material different from a coating material.

Also in accord with the first aspect of the invention, the hook structure may be formed at least in part from a resiliently deformable material. Alternatively, it may be formed at least in part from a pliable material.

In a second aspect of the invention a method is provided comprising: a deployment in which a housing containing a speaker for providing sound to a listener, and having an elongated hook structure formed of a deformable material and coupled at each end to the housing, releases one end of the hook structure while remaining coupled to the hook structure at or near the other end; and a stowage in which the housing receives the released end of the hook structure so as to be coupled to both ends of the hook structure.

In accord with the second aspect of the invention, the method may further comprise a mirror deployment in which the housing releases the other end of the hook structure while remaining coupled to the end released in the deployment.

In a third aspect of the invention an apparatus is provided comprising: an elongated structure formed from a deformable material; and a fastener at or near each end of the elongated structure, each fastener including a body adapted to mate with a receptacle in a housing for a receiver, for coupling the elongated structure to the housing at or near a respective end of the elongated structure, wherein at least one fastener can be coupled and uncoupled to the housing.

In accord with the third aspect of the invention, the body of the fastener is formed at least in part from a resiliently deformable material. For example, the body of the fastener can include a ring feature of a resiliently deformable plastic or a rubber that deforms as the body is forced into the receptacle up to a certain depth, and then returns to its undeformed state when it reaches an enlarged portion of the receptacle, so that the body tends to remain fixed in the housing until it is pulled out.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 5:
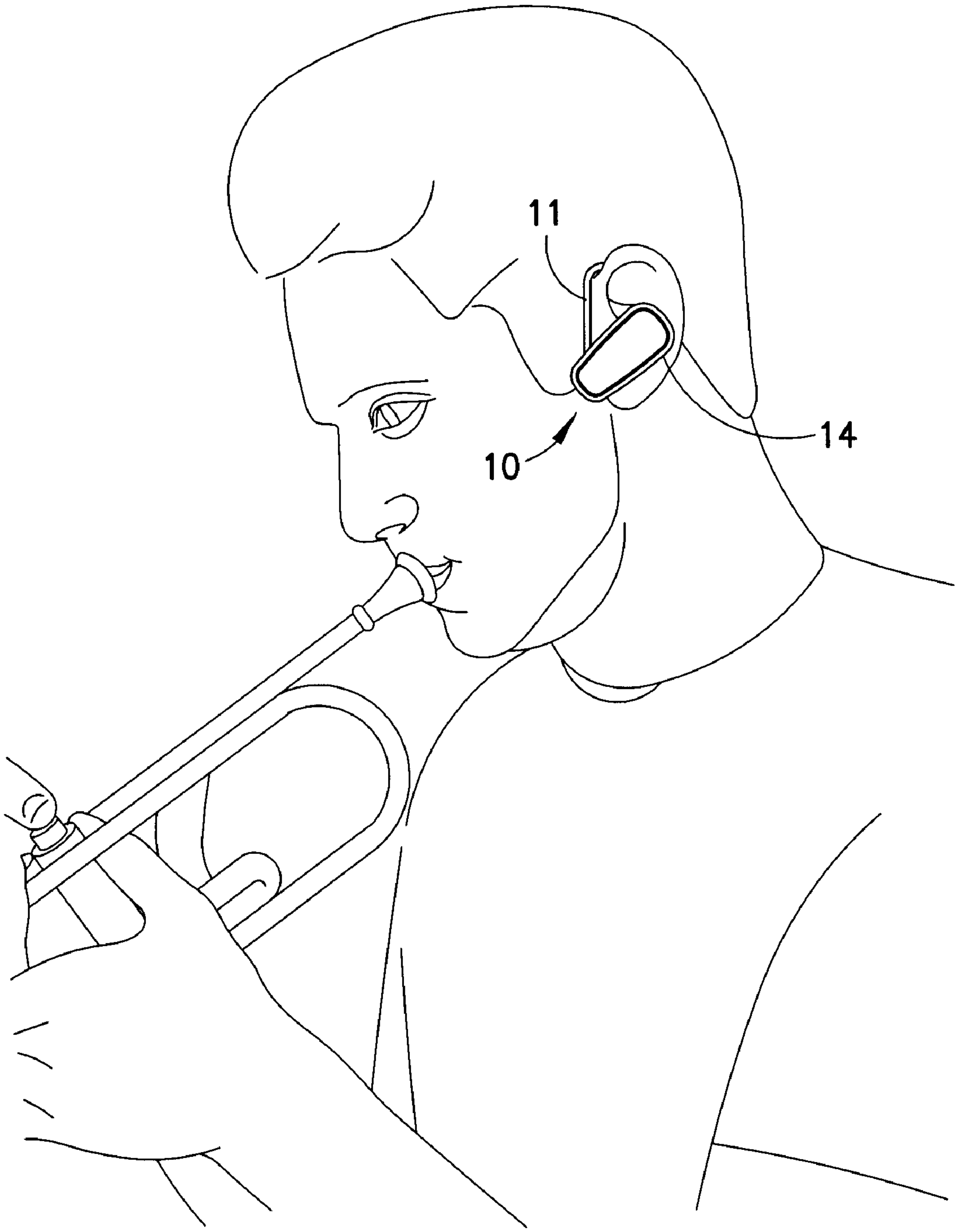
FIG. 5 shows a person wearing the headset of FIG. 1.

Referring now to FIGS. 1-5, a monaural headset 10 according to the invention includes a housing 14 containing a receiver (not shown) and a speaker 12 of a size suitable for inserting into the ear of a listener, and also includes a deformable elongated hook structure 11 for holding the headset on the ear of the listener. The hook structure is stowed in a channel feature 15 (FIG. 2) circumscribing a portion of the housing. At least one end of the hook structure is removably coupled to the housing via a protuberance 11 that fits in a receptacle 14*a* in the housing at an end of the channel feature. To wear the headset, the protuberance is pulled from the receptacle, and the hook structure is partially straightened, as needed, to fit around the ear of the listener (FIG. 5). One end of the hook structure remains attached to the housing, and the headset is placed on the ear so that the attached portion of the hook structure rests in front of the listener's ear, i.e. between the ear and the listener's face. The protuberance is advantageously at least in part a resiliently deformable body in that it deforms to enter the receptacle in the housing, and at least a portion of it returns to its undeformed state when the protuberance reaches a certain depth in the receptacle. To uncouple the hook structure, the undeformed portion of the protuberance must again deform as the protuberance is removed from the receptacle.

The invention of course encompasses fastener mechanisms that are not a protuberance. For example, an end of the hook structure can be coupled to the housing via a body of substantially the same diameter as the hook structure and so is not a protuberance, and that fits into a receptacle in the housing and includes a ring feature of resiliently deformable material—such as a rubber or a resiliently deformable plastic material—that deforms as the body is forced into the receptacle until the body reaches a certain depth where the receptacle is enlarged sufficient to accommodate the ring feature in its undeformed state. When the ring feature enters the enlarged portion of the receptacle, it returns to its undeformed state, and so holds the hook structure to the housing until the fastener is pulled out of the receptacle.

Figure 1:
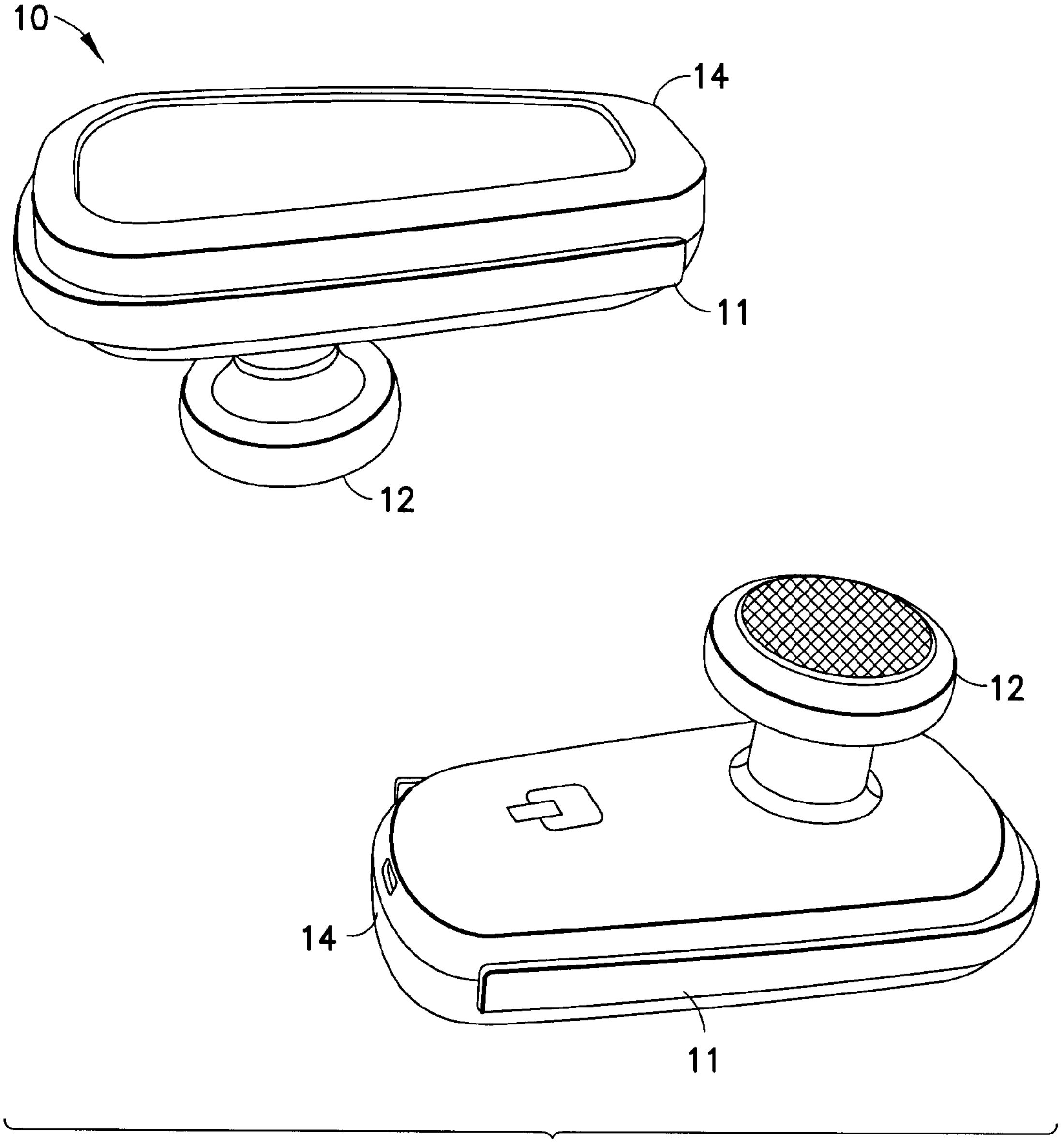
FIG. 1 is a perspective view of a monaural headset according to the invention, having an integral hook, showing the hook in the stowed position.
Figure 2:
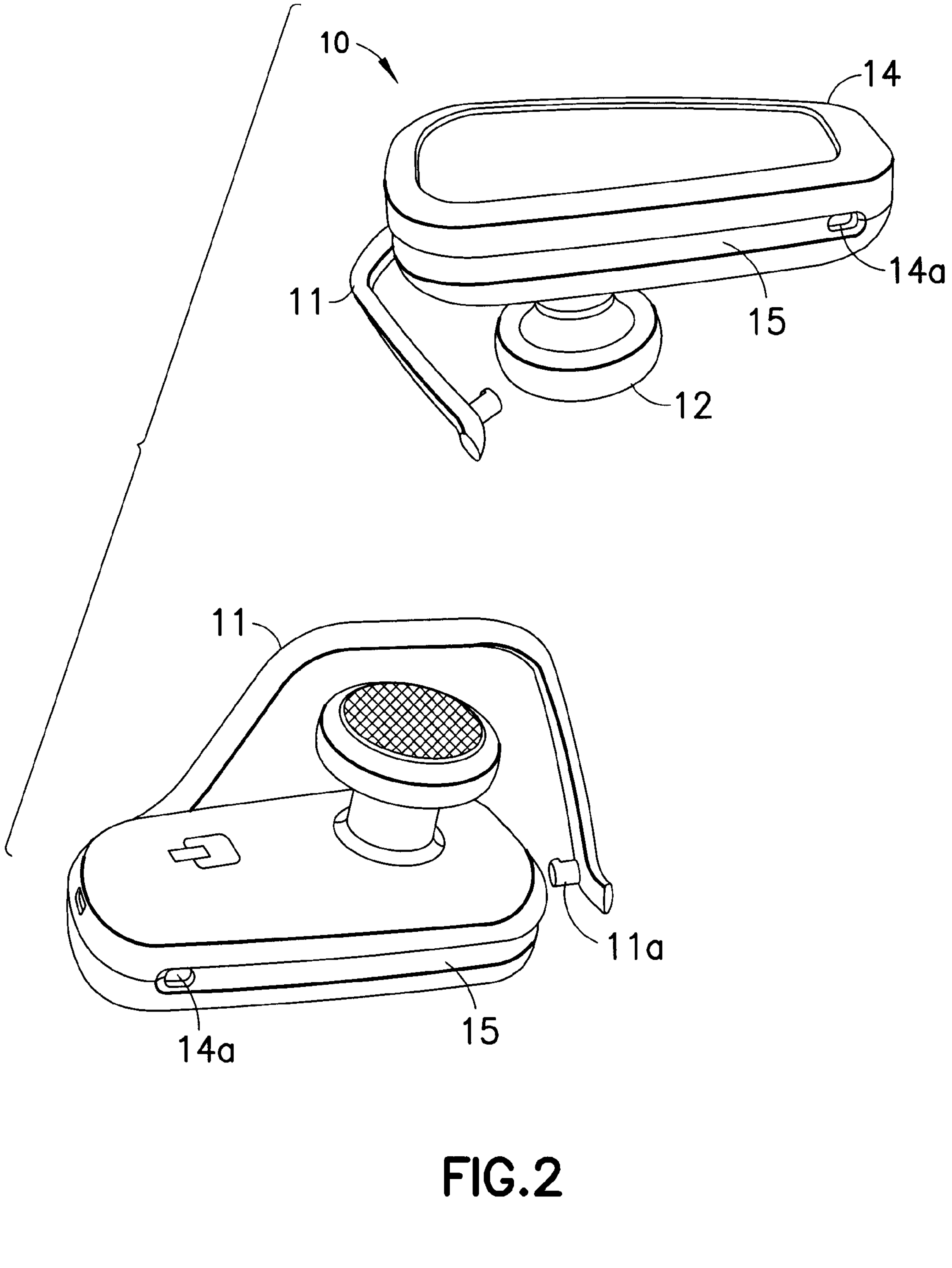
FIG. 2 is a perspective view of the headset of FIG. 1 showing the hook in the deployed position.
Figure 3:
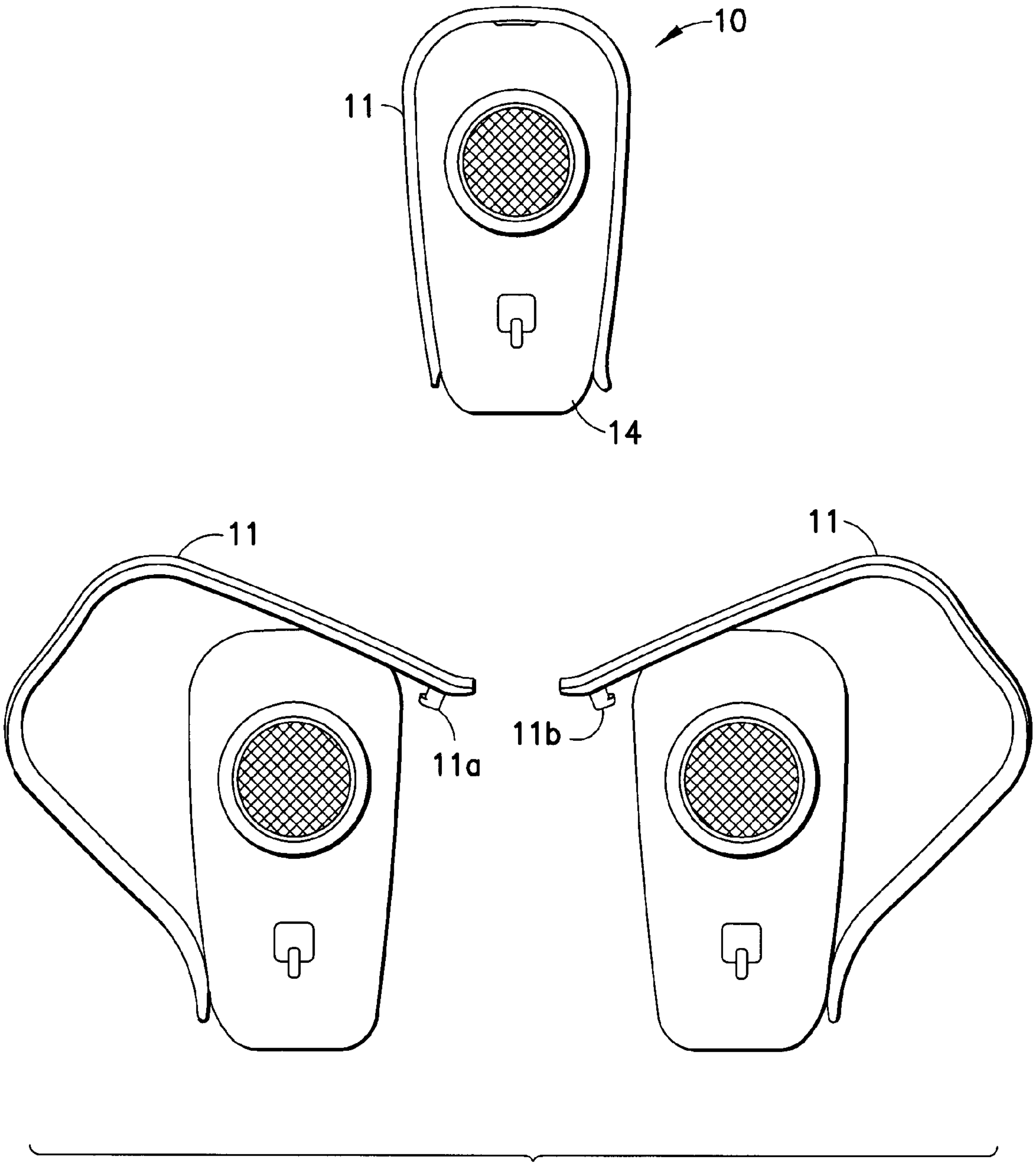
FIG. 3 is a front view of the headset of FIG. 1 showing the hook deployed in two mirror configurations.
Figure 4:
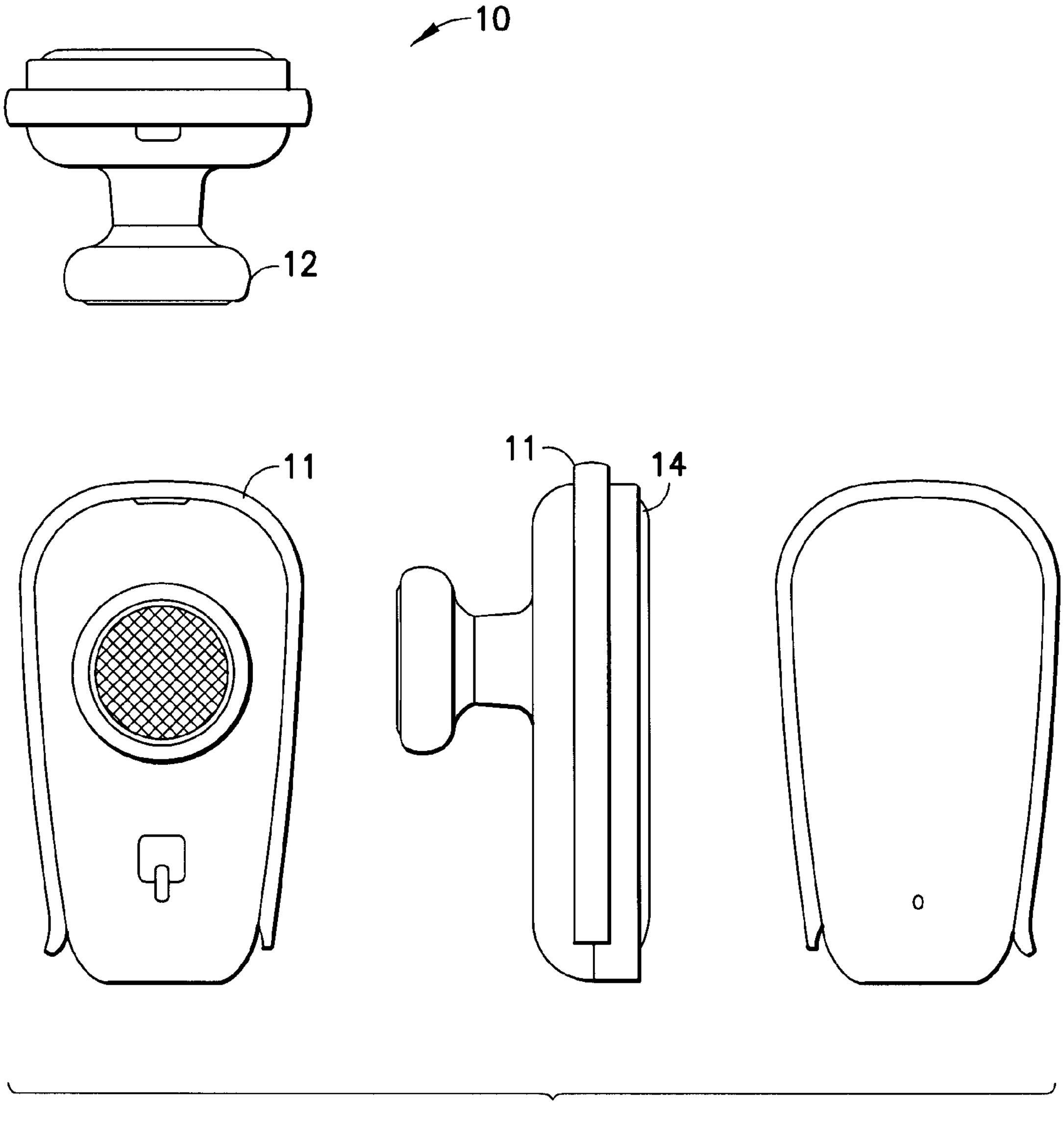
FIG. 4 is a top view, a front view, a side view, and a back view of the headset of FIG. 1.

As shown in FIG. 3, to make it possible for a listener to use the headset in either ear, both ends of the hook structure are removably coupled to the housing via respective protuberances 11*a* 11*b* and mating receptacles. A listener then detaches one or the other end of the hook structure from the housing to wear the headset, depending on which ear the listener intends to place the speaker in.

The hook structure can be many different kinds of materials; it can be a rubber material, a resiliently deformable or at least pliable plastic, or even a metallic material, or a combination of such materials, and can even have a core and a coating where only (usually) the core is resiliently deformable or at least pliable (although both the core and the coating can be such). For example, the hook structure could have an aluminium core, and so be pliable, and in some embodiments could have a soft rubber or plastic coating. As another example of a metallic material, the hook structure could be made from a spring metal, such as spring steel, in which case, the hook structure can be said to be resiliently deformable.

Whatever the material that is used to form the hook structure, the hook structure must be at least slightly deformable so as to adjust to different ear shapes and sizes. Ideally, the hook structure is either resiliently deformable or simply pliable or somewhere in between. A structure is resiliently deformable as that term is used here if it is able to be deformed by the application of force, and tends more or less to return to its undeformed shape when the force is removed. A structure is pliable as that term is used here if it is able to be deformed by the application of force, and if it is so deformed, remains in the deformed state until it is undeformed (by the application of further force).

The hook structure can be e.g. a soft elasto-plastic material, with hysteresis. Such a hook structure is resiliently deformable. In general, the hook structure, whether resiliently deformable or simply pliable or somewhere in between, should behave so that when partially straightened to fit over the listener's ear, it holds the partially straightened shape under to the weight of the headset, but is easily bent back or tends to return to its shape for stowage in the channel feature 15. Ideally, when partially straightened to fit over the listener's ear, the hook structure has a slight (internal) restoring force tending to return it to the shape it has when stowed, so that the hook structure tends to lightly grip the listener's ear.

For a pure rubber hook structure, an exemplary material for forming the hook structure is the thermoplastic elastomer (TPE) SANTOPRENE™ 111-87. (SANTOPRENE is a registered trademark of Advanced Elastomer Systems (AES), an affiliate of Exxon Mobile, with corporate headquarters located in Akron, Ohio.) SANTOPRENE is a black thermoplastic molding grade elastomer with good fluid resistance. It has excellent flex fatigue resistance, excellent ozone resistance, and superior mold surface appearance. SANTOPRENE is a shear-dependent material that can be processed on conventional thermoplastic equipment for injection molding, extrusion, or blow molding.

Other elastomeric materials are also appropriate for use in forming the hook structure.

The channel feature 15 in some embodiments can be of a depth and width (or of a radius in embodiments wear it is semi-circular in cross) sufficient for pushing a portion of the hook structure into the channel feature. For example, in some embodiments, the channel feature is sized in its depth and width so that more than half of a cross section of the hook structure in a direction perpendicular to its long direction fits in the channel feature. In some such embodiments, the hook structure is squeezed into the channel feature, and deforms in this squeezing process.

The channel feature is not essential. The hook structure 11, which is advantageously a rubber material (such as SANTOPRENE or other TPE material, but also including other kinds of rubbers) will tend (because of a high coefficient of static friction) to stay on the housing where it is stowed even without forcing it into a channel feature.

Figure 6:
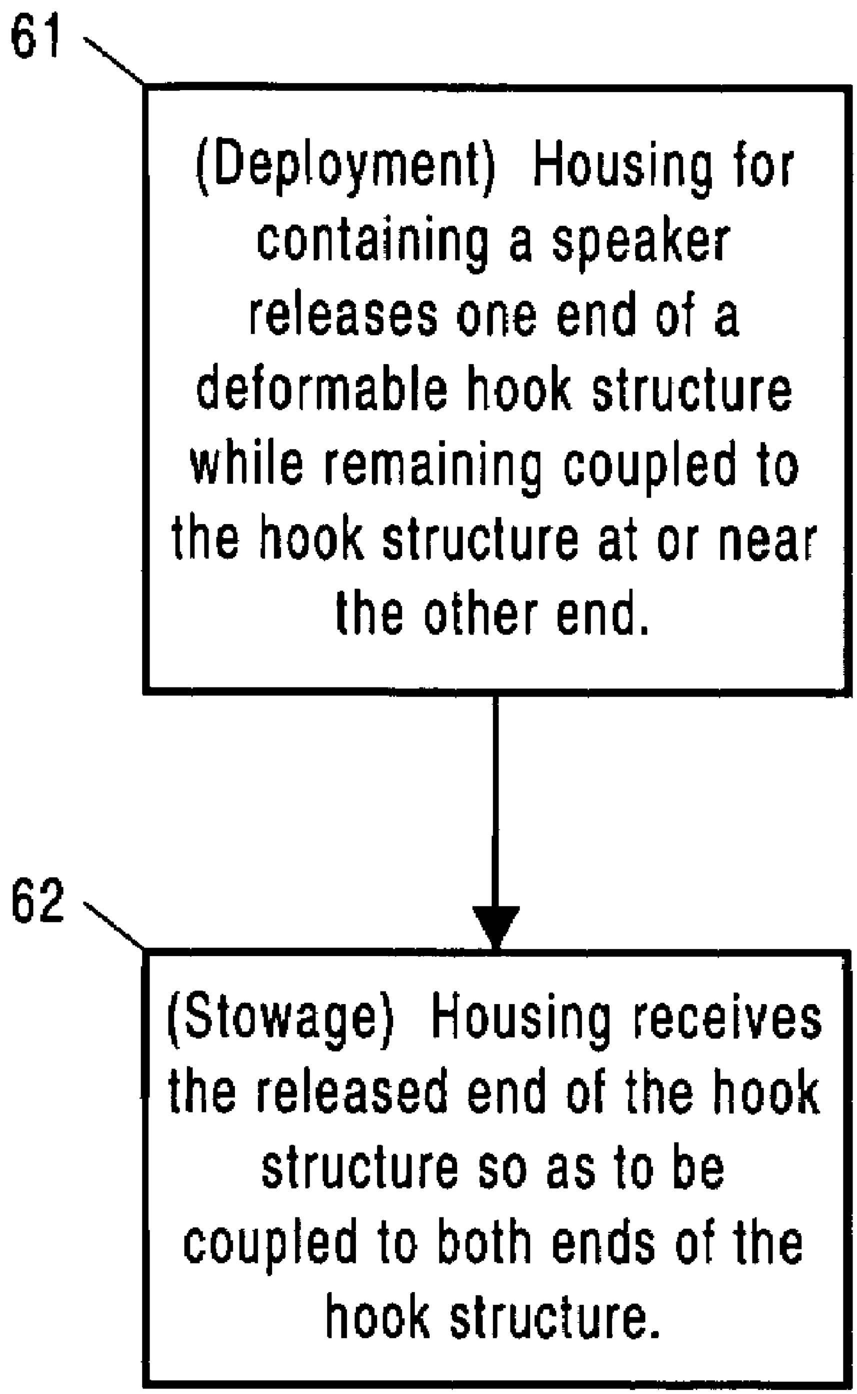
FIG. 6 is a flowchart illustrating use of a housing for a speaker, according to the invention.

Referring now to FIG. 6, a method by which a housing for a speaker is used by a user/listener in wearing the housing (and so holding the speaker near the listener's ear) is shown as including a deployment (act) in which the housing, having an elongated hook structure formed of a deformable material and coupled at each end to the housing, releases one end of the hook structure while remaining coupled to the hook structure at or near the other end. Then, in a stowage (act) 62, after the listener is finished listening, the housing receives the released end of the hook structure so as to be coupled to both ends of the hook structure. The method can also include a mirror deployment in which the housing releases the other end of the hook structure while remaining coupled to the end released in the deployment. In accord with at least some aspects of the invention, the housing can also include a channel feature at least partially circumscribing the speaker, and in the deployment at least a portion of the hook structure is released from the channel feature, and in the stowage the released portion is received by the channel feature. In some embodiments, the hook may be deformed in its dimensions while being stowed or while being deployed, such as when it is stowed in such a channel feature, or while it is being pulled out of such a channel feature.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A hook apparatus for a headset, comprising: a housing, for holding a speaker, the housing having an ear-facing surface configured for communicating sound from the speaker to the ear of a listener; and a hook structure, formed as an elongated structure from a deformable material and having at least one end removably coupled to the housing, wherein the housing surface has a channel feature at least partially circumscribing the ear-facing surface, of a depth suitable for containing at least a portion of a length of the hook structure.

2. An apparatus as in claim 1, wherein the hook structure is deformed in its dimensions when contained by the channel feature.

3. An apparatus as in claim 1, wherein the hook structure is removably coupled to the housing at or near both ends of the hook structure.

4. An apparatus as in claim 1, wherein the hook structure is formed of an elastomer.

5. An apparatus as in claim 4, wherein the elastomer is a thermoplastic elastomer.

6. An apparatus as in claim 4, wherein the hook structure includes at least a core of a metallic material.

7. An apparatus as in claim 1, wherein the hook structure is formed at least in part from a resiliently deformable material.

8. An apparatus as in claim 1, wherein the hook structure is formed at least in part from a pliable material.

9. A method for holding a headset, comprising: a deployment in which a housing containing a speaker for providing sound to a listener, and having an elongated hook structure formed of a deformable material and coupled at each end to the housing, releases one end of the hook structure while remaining coupled to the hook structure at or near the other end of the hook structure; and a stowage in which the housing receives the released end of the hook structure so as to be coupled to both ends of the hook structure, wherein the housing includes a channel feature at least partially circumscribing the speaker, and in the deployment at least a portion of the hook structure is released from the channel feature, and in the stowage the released portion is received by the channel feature.

10. A method as in claim 9, further comprising a mirror deployment in which the housing releases the other end of the hook structure while remaining coupled to the end released in the deployment.

11. A method as in claim 9, wherein during the stowage of the hook in the channel feature, the hook is deformed in its dimensions.

12. A hook apparatus for a headset, comprising: a hook structure, formed as an elongated structure, wherein the elongated structure is formed from a deformable material; and a fastener at or near each end of the elongated structure, each fastener including a body configured to mate with a receptacle in a housing for a receiver, for coupling the elongated structure to the housing at or near a respective end of the elongated structure, wherein at least one fastener can be coupled and uncoupled to the housing, wherein the housing has a channel feature at least partially circumscribing the housing, of a depth suitable for containing at least a portion of the elongated structure.

13. An apparatus as in claim 12, wherein the hook structure is formed of a pliable material.

14. An apparatus as in claim 12, wherein the hook structure is formed of a resiliently deformable material.

15. An apparatus as in claim 12, wherein the body of the fastener is formed at least in part from a resiliently deformable material.

* * * * *